(12) United States Patent
Unami

(10) Patent No.: US 11,809,818 B2
(45) Date of Patent: Nov. 7, 2023

(54) INFORMATION PROCESSING APPARATUS, INFORMATION PROCESSING METHOD, AND INFORMATION PROCESSING PROGRAM

(71) Applicant: Lambda Systems Inc., Tokyo (JP)

(72) Inventor: Shinji Unami, Tokyo (JP)

(73) Assignee: Lambda Systems, Inc., Tokyo (JP)

( * ) Notice: Subject to any disclaimer, the term of this patent is extended or adjusted under 35 U.S.C. 154(b) by 0 days.

(21) Appl. No.: 17/178,311

(22) Filed: Feb. 18, 2021

(65) Prior Publication Data

US 2021/0182478 A1 Jun. 17, 2021

Related U.S. Application Data

(63) Continuation of application No. PCT/JP2019/047080, filed on Dec. 2, 2019.

(30) Foreign Application Priority Data

Dec. 28, 2018 (JP) ................................ 2018-247078

(51) Int. Cl.
*G06F 40/186* (2020.01)
*G06F 16/435* (2019.01)
(Continued)

(52) U.S. Cl.
CPC .......... *G06F 40/186* (2020.01); *G06F 16/435* (2019.01); *G06F 16/907* (2019.01);
(Continued)

(58) Field of Classification Search
CPC ...... G06F 40/186; G06F 40/20; G06F 16/435; G06F 16/907; G06F 3/147; G06F 21/31;
(Continued)

(56) References Cited

U.S. PATENT DOCUMENTS

| 7,237,252 B2 * | 6/2007 | Billmaier | ............. G06F 1/3203 715/744 |
|---|---|---|---|
| 10,296,558 B1 * | 5/2019 | McInerny | ............. G06F 40/103 |

(Continued)

FOREIGN PATENT DOCUMENTS

| EP | 2574073 A1 * | 3/2013 | ....... H04N 21/25825 |
|---|---|---|---|
| JP | 1998-021029 | 1/1998 | |

(Continued)

OTHER PUBLICATIONS

International Search Report from PCT/JP2019/047080 dated Jan. 28, 2020, and English translation.

(Continued)

*Primary Examiner* — Chau T Nguyen
(74) *Attorney, Agent, or Firm* — DLA Piper LLP (US)

(57) ABSTRACT

An information processing apparatus includes: a storage that stores a template which defines a display form of a ticker; a material data acquisition unit that acquires material data to be displayed on the ticker; a selection unit that selects, on the basis of the contents of the material data acquired by the material data acquisition unit, a template stored in the storage; a production unit that produces ticker data by applying the template selected by the selection unit to the material data acquired by the material data acquisition unit; and a provision unit that provides provision data which includes the ticker data produced by the production unit.

9 Claims, 5 Drawing Sheets

(51) Int. Cl.
  *G06F 16/907* (2019.01)
  *G06F 40/20* (2020.01)
  *G10L 25/48* (2013.01)
  *G06V 10/40* (2022.01)
(52) U.S. Cl.
  CPC .............. *G06F 40/20* (2020.01); *G10L 25/48* (2013.01); *G06V 10/40* (2022.01)
(58) Field of Classification Search
  CPC .............. G06F 16/285; G06F 16/9017; G06F 18/24323; G06V 10/40; G06V 10/764; G06V 10/955; G06V 20/58; G10L 25/48; H04N 5/278; G05D 1/0088; G06N 20/00; G06N 5/045
  See application file for complete search history.

(56) References Cited

U.S. PATENT DOCUMENTS

| | | | | |
|---|---|---|---|---|
| 2004/0078814 | A1* | 4/2004 | Allen | H04N 21/4781 725/135 |
| 2005/0111644 | A1* | 5/2005 | Edwards | H04M 15/06 379/142.01 |
| 2008/0081700 | A1* | 4/2008 | Biniak | H04N 21/8405 348/E7.071 |
| 2008/0313650 | A1* | 12/2008 | Arnquist | G06F 9/451 719/316 |
| 2009/0089838 | A1* | 4/2009 | Pino, Jr. | H04N 21/2665 725/40 |
| 2009/0150768 | A1* | 6/2009 | Bae | G01C 21/26 715/248 |
| 2011/0243453 | A1* | 10/2011 | Kashima | G06F 16/5838 382/195 |
| 2012/0331507 | A1* | 12/2012 | Klappert | H04N 21/472 725/47 |
| 2017/0017618 | A1* | 1/2017 | Dunn | G06F 40/186 |
| 2017/0351414 | A1* | 12/2017 | Macho Cierna | G10L 17/22 |
| 2018/0321840 | A1 | 11/2018 | Watanabe et al. | |
| 2018/0343173 | A1 | 11/2018 | Yamauchi et al. | |

FOREIGN PATENT DOCUMENTS

| | | |
|---|---|---|
| JP | 2005-109566 | 4/2005 |
| JP | 2007-104405 | 4/2007 |
| JP | 2010-068434 | 3/2010 |
| JP | 2011-254342 | 12/2011 |
| JP | 2013-232813 | 11/2013 |
| WO | WO-0211435 A2 * 2/2002 | ........... H04N 21/422 |

OTHER PUBLICATIONS

The Office Action dated Aug. 30, 2021, of counterpart Taiwanese Application No. 108147860, along with an English translation.

* cited by examiner

ASSOCIATION INFORMATION A

| MAJOR CLASS | MEDIUM CLASS | MINOR CLASS | TEXT FEATURES | AUDIO FEATURES | IMAGE FEATURES | PROVIDER | TEMPLATE |
|---|---|---|---|---|---|---|---|
| SPORTS | BASEBALL | PROFESSIONAL BASEBALL | ...... | ...... | ...... | ...... | S1 |
| | | HIGH SCHOOL BASEBALL | ...... | ...... | ...... | ...... | S2 |
| | | MAJOR LEAGUE | ...... | ...... | ...... | ...... | S3 |
| | SOCCER | J. LEAGUE | ...... | ...... | ...... | ...... | S4 |
| | | WORLD CUP | ...... | ...... | ...... | ...... | S5 |
| | | ABROAD | ...... | ...... | ...... | ...... | S6 |
| | RUGBY | — | ...... | ...... | ...... | ...... | S7 |
| | TENNIS | — | ...... | ...... | ...... | ...... | S8 |
| | BADMINTON | — | ...... | ...... | ...... | ...... | S9 |
| | BASKETBALL | — | ...... | ...... | ...... | ...... | S10 |
| | VOLLEYBALL | — | ...... | ...... | ...... | ...... | S11 |
| | HANDBALL | — | ...... | ...... | ...... | ...... | S12 |
| | MARATHON | — | ...... | ...... | ...... | ...... | S13 |
| | RELAY RACE | — | ...... | ...... | ...... | ...... | S14 |
| GENERAL PURPOSE | WEATHER INFORMATION | WEATHER | ...... | ...... | ...... | ...... | H1 |
| | | DISASTER | ...... | ...... | ...... | ...... | H2 |
| | TRAFFIC INFORMATION | — | ...... | ...... | ...... | ...... | H3 |
| | EXTERNAL IMAGE | — | ...... | ...... | ...... | ...... | H4 |
| SNS | TWEET | — | ...... | ...... | ...... | ...... | N1 |
| | BLOG | — | ...... | ...... | ...... | ...... | N2 |
| ELECTION | MEMBER OF THE HOUSE OF REPRESENTATIVES | — | ...... | ...... | ...... | ...... | E1 |
| | HOUSE OF COUNCILORS | — | ...... | ...... | ...... | ...... | E2 |
| | HEAD | — | ...... | ...... | ...... | ...... | E3 |

FIG. 4

INFORMATION PROCESSING APPARATUS, INFORMATION PROCESSING METHOD, AND INFORMATION PROCESSING PROGRAM

TECHNICAL FIELD

This disclosure relates to an information processing apparatus, an information processing method, and an information processing program.

BACKGROUND

For example, Japanese Laid-Open Patent Publication No. 10-021029 discloses a technique that stores a plurality of ticker candidate data as help information for a target operation, displays the plurality of candidate data, selects the candidate data, specifies parameters that indicate at least the display direction and display speed when synthesizing the selected candidate data, gives synthesis instructions, synthesizes the selected candidate data according to the synthesis instructions to generate ticker data with information on the display direction and display speed set, and displays the synthesized ticker data according to the set display direction and display speed.

Japanese Laid-Open Patent Publication No. 2011-254342 also discloses a technique that combines symbols extracted from video, impressive speech space and impressive video segments, and outputs them as edited video.

In addition, Japanese Laid-Open Patent Publication No. 2010-068434 describes a technology that extracts keywords from the played program material data in the ticker separator, video recognition processor, and voice recognition processor, compares them sequentially to the keyword candidates stored and accumulated by the thesaurus dictionary, presents the keywords with high correlation or frequency of occurrence to the operator, and waits for the operator's input to generate metadata and transfers it to a video server.

However, with the conventional technology, the operator needs to manually select a corresponding display form appropriate for the contents of the ticker, which may increase the costs of producing the ticker such as the labor costs of the operator or the costs of installing equipment used by the operator.

It could therefore be helpful to provide an information processing apparatus, an information processing method, and an information processing program capable of reducing costs associated with ticker production.

SUMMARY

I thus provide:

(1) An information processing apparatus includes: a storage for storing a template that defines a display form of a ticker; a material data acquisition unit for acquiring a material data to be displayed on the ticker; a selection unit for selecting a template stored in the storage on the basis of contents of the material data acquired by the material data acquisition unit; a production unit for producing ticker data by applying the template selected by the selection unit to the material data acquired by the material data acquisition unit; and a provision unit for providing data including the ticker data produced by the production unit.

(2) The selection unit may be configured to: obtain association information for associating features of text data indicating characteristics of the text data with the template, calculate, when the material data acquired by the material data acquisition unit contains the text data, features of the acquired text data, and select the template corresponding to the text data on the basis of the calculated features of the text data and the acquired association information.

(3) The selection unit may be configured to: obtain association information for associating features of audio data indicating characteristics of the audio data with the template, calculate, when the material data acquired by the material data acquisition unit contains the audio data, features of the acquired audio data, and select the template corresponding to the audio data on the basis of the calculated features of the audio data and the acquired association information.

(4) The selection unit may be configured to: obtain association information for associating features of image data indicating characteristics of the image data with the template, calculate, when the material data acquired by the material data acquisition unit contains the image data, features of the acquired image data, and select the template corresponding to the image data on the basis of the calculated features of the image data and the acquired association information.

(5) The selection unit may be configured to: obtain association information for associating provider information that provides the material data with the template, and select, if the material data acquired by the material data acquisition unit includes the provider information, a template corresponding to the provider information of the material data on the basis of the acquired provider information and the acquired association information.

(6) The selection unit may select a plurality of templates on the basis of contents of the material data acquired by the material data acquisition unit, the production unit may produce a plurality of ticker data by applying the plurality of templates selected by the selection unit, and the provision unit may provide the plurality of ticker data produced by the production unit in a selectable manner.

(7) The provision unit may provide the ticker data produced by the production unit as image data.

(8) A method of processing information executed in an information processing apparatus includes the steps of: storing a template that defines a display form of a ticker; acquiring material data to be displayed on the ticker; selecting a template stored in the storing step on the basis of contents of the material data acquired by the material data acquiring step; producing ticker data by applying the template selected in the selecting step to the material data acquired in the material data acquiring step; and providing provision data including the ticker data produced in the producing step.

(9) An information processing program causes a computer to execute the functions of: storing a template that defines a display form of a ticker; acquiring material data to be displayed on the ticker; selecting a template stored in the storing function on the basis of contents of the material data acquired by the material data acquiring function; producing ticker data by applying the template selected by the selecting function to the material data acquired by the material data acquiring function; and providing provision data including the ticker data produced by the producing function.

A template that defines a display form of a ticker is stored, material data to be displayed on the ticker is acquired, the stored template is selected on the basis of the contents of the acquired material data, the selected template is applied to the acquired material data to produce ticker data, and the provision data including the produced ticker data is provided, thereby reducing the costs of the ticker production.

BRIEF DESCRIPTION OF THE DRAWINGS

FIG. 4 is an example of association information used in the information processing apparatus.

DETAILED DESCRIPTION

With reference to the drawings, an information processing apparatus, an information processing method, and an information processing program according to one example will be described in detail below.

Figure 1:
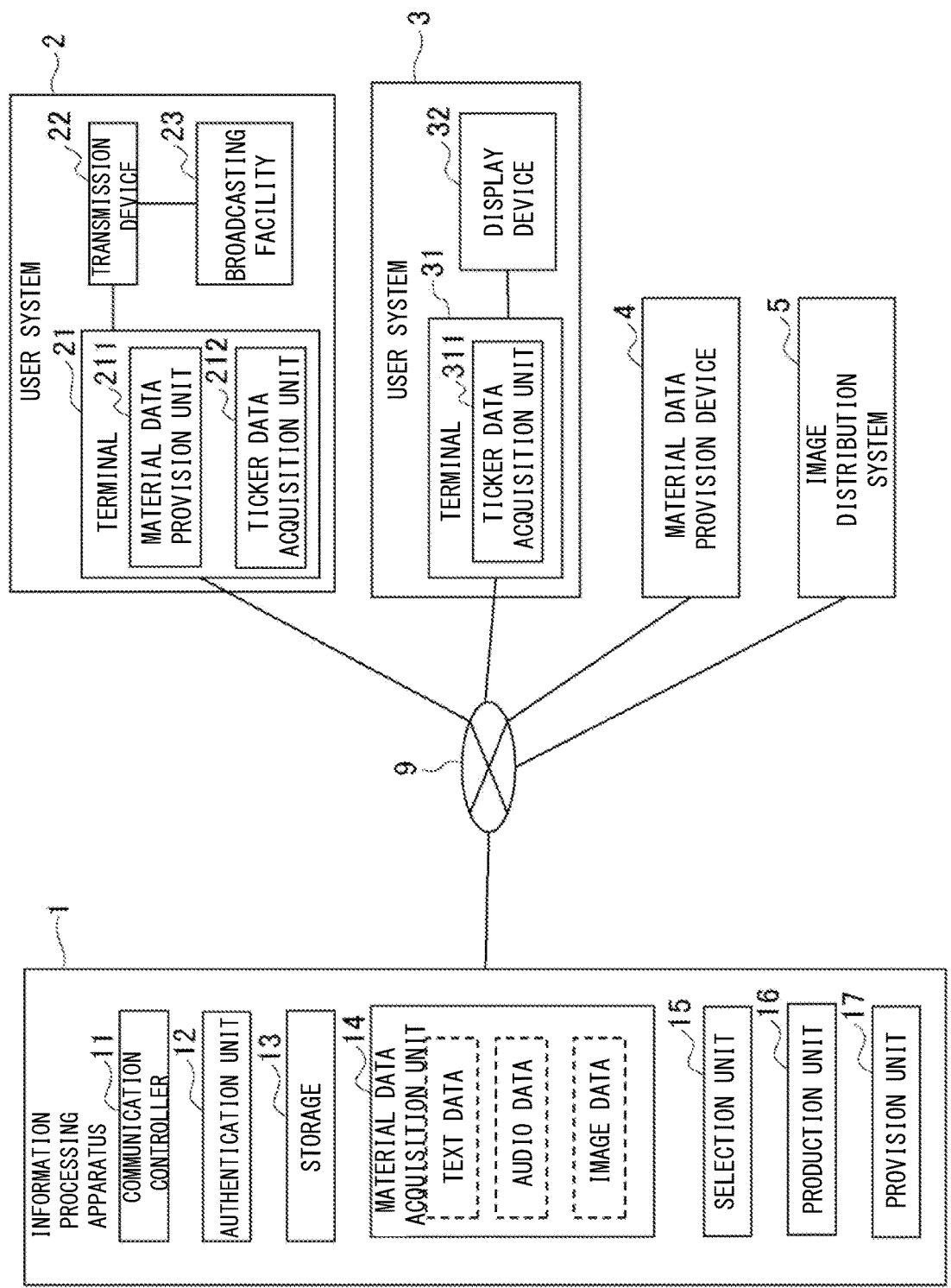
FIG. 1 is a block diagram illustrating an example of a software configuration of an information processing apparatus.

First, with reference to FIG. 1, functions of an information processing apparatus will be described. FIG. 1 is a block diagram illustrating an example of a software configuration of an information processing apparatus according to an example.

FIG. 1 illustrates an information processing apparatus 1 communicatively connected to a terminal 21, a terminal 31, a material data provision device 4, and an image distribution system 5 via a network 9. Although FIG. 1 illustrates connection destinations of the information processing apparatus 1 by way of example, FIG. 1 does not limit the connection destinations of the information processing apparatus 1.

The information processing apparatus 1 includes a communication controller 11, an authentication unit 12, a storage 13, a material data acquisition unit 14, a selection unit 15, a production unit 16, and a provision unit 17 as functional units. The above functional units of the information processing apparatus 1 are described as being functional modules embodied by the information processing program (software).

The communication controller 11 controls communication between the information processing apparatus 1 and the terminals 21, 31, material data provision device 4 or image distribution system 5 (hereinafter all or some of the terminals 21, 31, material data provision device 4, and image distribution system 5 may be referred to as the "terminal 21 and other devices") connected via a network. The communication controller 11 may, for example, provide a user interface (UI) that uses the information processing apparatus 1 to the devices such as the terminal 21.

The authentication unit 12 authenticates a user of the terminal 21 and other devices using the communication controller 11. For example, a user of the terminal 21 is directed to a person that has the authority to use the functions provided by the information processing apparatus 1, which is communicatively connected from the terminal 21. The authentication unit 12 authenticates a user with user privileges, for example, by a login ID and password assigned to each user. The user in this example need not be an identified individual. For example, if a single login ID is used sequentially by multiple people, the user may be the one currently using the user ID. The authentication unit 12 may use any authentication method (e.g., biometric authentication, and magnetic card authentication) other than the authentication using the login ID and password.

"Ticker," "ticker data," "material data," "ticker display form," and "template" will be described below.

A ticker is directed to information such as text information, symbol information, graphic information, audio information or image information, or combination thereof (hereinafter, referred to as "text information, and others," for example) that are superimposed, inserted, or combined (hereinafter, referred to as "superimposition, and others," for example) with an original image such as a moving image and a still image. The original image is directed to, for example, a television image used for television broadcasting, a video used for a video distribution service, and a display image displayed on a large display device. In this example, the data used for a ticker superimposed on the original image, for example, is referred to as ticker data. The ticker data is produced on the basis of the material data described below and provided to a user system possessed by the user (described below). The ticker data is superimposed on all or part of the original image in the user system to be broadcast, distributed or displayed, for example. The ticker data may be, for example, image data including ticker data. A ticker may also be referred to as a caption, subtitle, alert, or superimpose, for example, depending on the region, contents, or format in which it is used, and shall be included in the ticker in the present embodiment.

The material data is directed to data of a material used for the ticker such as text data including text information, audio data including audio information, graphic data represented by vector data, for example, or image data including image information, or a combination thereof. Since the graphic information is rasterized to be an image, the image data may include the graphic information.

The text data may include, for example, time information, weather information, traffic information, breaking news or subtitles, for example. The text data may include input data manually entered through a keyboard (not shown) of the terminal 21. The text data is displayed, for example, in television broadcasts, videos used for video distribution services, or display images displayed on a large display device.

The audio data may include, for example, speech or text information generated by speech recognition. The audio data is used, for example, in the secondary audio of the television broadcast or converted to the text data to be displayed on the television broadcast, for example.

The image data may include still image information and moving image information (including animation of multiple still images). The image data is displayed as thumbnails, split screen, or full screen on the display screen of TV broadcasts, for example. The image data may also include audio. For example, the video information may include audio that is played back with the video.

The material data may include information specific to the contents of the television broadcast program. For example, the material data may include sports-specific score stats, game stats or player introductions in sports programs, news items in news programs, contents posted on social networking services (SNS), or flash report of votes counted in election programs, for example.

The display form of the ticker is directed to a form of decoration, effect, or review that is set for the material data. The display form of the ticker may include settings such as the position of the ticker in the original image, font for the text information, emphasis, switching between 2 dimensional (2D) and 3D display, effects such as 3D motion (animation) or 3D rotation, addition of reading form of the Chinese characters, and display of multiple lines (hereinafter, referred to as "decorations and others"), for example. The display form of the ticker (e.g., decorations and others) may include a setting of output volume for audio information, or a setting of voice recognition, or a setting of a display position or display size on the screen for image information, for example. The display form of the ticker may include the order or time points of transmitting the produced ticker data. The display form of the ticker is set (defined) by a template described below.

A template is directed to a configuration information (configuration data) that defines the display form of the ticker, and is prepared in advance as a configuration file, for example. The ticker data is produced by applying the display form set in the template to the material data. For example, if a ticker that is specific to contents of a TV program of a TV broadcast is wished to be used, a template corresponding to the TV program may be prepared in advance to produce a ticker data specific to the TV broadcast.

The template may be pre-set (edited) by a user. A UI for editing the display form of the ticker may be provided to a user such as a user of the terminal 21, for example, allowing the template to be set.

The storage 13 stores one or more templates that define the display form of the ticker. The template may be pre-stored in the storage 13 as a readable configuration file, for example. The storage 13 stores multiple types of templates. For example, when the ticker specific to the contents of the TV program as described above is produced, a plurality of templates specific to the contents of the program is stored in the storage 13, allowing a template capable of creating a ticker data specific to the contents of the program to be easily selected from among the stored templates.

The material data acquisition unit 14 acquires the material data to be displayed on the ticker. FIG. 1 illustrates an example in which the material data acquisition unit 14 acquires text data, audio data and image data. The material data acquisition unit 14 acquires the material data from inside the information processing apparatus 1 (e.g., the storage 13) or outside the information processing apparatus 1. FIG. 1 illustrates an example in which the material data acquisition unit 14 acquires the material data from the material data provision unit 211 of the terminal 21 or the material data provision device 4. In this example, when the "acquisition" of data is referred to, it may be a pull-type acquisition of data, such as a download, or a push-type acquisition of data that receives data transmitted from another device. For example, the material data acquisition unit 14 may provide a UI for entering or selecting material data to be provided to the terminal 21, and the user of the terminal 21 may acquire the material data by operating the UI displayed on the terminal 21. In addition, the material data acquisition unit 14 may acquire the material data by reading the material data stored in the material data provision device 4.

The selection unit 15 selects one or more templates stored in the storage 13 on the basis of the contents of the material data acquired by the material data acquisition unit 14. The template is selected on the basis of the contents of the material data to reduce the number of man-hours required for the user to select a template, thereby reducing the costs of producing the ticker data. Selecting a template may include, in addition to selecting one or more templates from a plurality of templates, determining the meaning (described below) of the material data in the ticker. The specific method of selecting a template on the basis of the contents of the material data will be described below.

Selecting a Template on the basis of the Features of the Material Data

The selection unit 15 may select a template on the basis of the features of the material data, as the contents of the material data. The features of the material data are directed to information that indicates the characteristics of the material data. As for the features of the material data, information indicating the characteristics may be different depending on the type of the material data. In the description below, for example, a method of calculating the features when the material data is text data, audio data, or image data will be illustrated. The storage 13 may store the association information. The association information is directed to information in which the features and the templates are associated with each other. That is, the association information is directed to information for selecting one or more templates on the basis of the features of the material data, and may be, for example, an algorithm for selecting a template (or the material data) when the features are used as an argument. The selection unit 15 selects one or more templates (or the material data) on the basis of the features of the material data and association information. For example, the selection unit 15 may select one template that is closest to the features, or may select a predetermined number of templates in the order of closest to the features, and may further select all templates that are within a predetermined range of features.

For example, if the material data is text data, the features of the material data may be the features of the text data. The features of the text data may be calculated by Term Frequency (word frequency)—Inverse Document Frequency (inverse of the number of document frequencies) (TF-IDF), a known text mining technique, for example. In TF-IDF, a specific word is extracted from a string of characters in the text data and the frequency of occurrence of the extracted word is calculated as features. For example, in the material data used in a particular sports program in the television broadcast, characteristic words may often be used in that sport. For example, the words "hit," "two-base hit," and "home run" are often used in baseball programs. Storage of association information between the frequency of occurrence of a particular word in a baseball program and a template specific to the baseball program allows a single template or multiple templates to be selected from the text data.

In addition, the features of the text data may be calculated from supplementary information such as the arrangement of the text data, for example. For example, in a baseball program, names and positions are obtained as sequence data for nine players, and in a soccer program, they are obtained as sequence data for eleven players. In addition, in horse racing programs, the data is obtained as sequence data for eight gates. The features of the text data are calculated as array data, and the array data and the templates are associated with each other and stored, allowing one template or multiple templates to be selected from the array data.

Further, the features of the text data may determine the meaning of the material data in the ticker from the specific information contained in the text data. The meaning of the material data is directed to a type or attribute of the material data, e.g., in a baseball ticker, information indicating the results of "out," "hit," "two-base hit," "three-base hit," and "home run." It may also be the information that indicates the results of "success" and "certain to be elected" and other results in an election program. For example, as association information, the meaning "out" of the material data is associated with the features "0" of the material data and stored in the storage 13. In the same manner, the meanings of the material data, i.e., "hit" is associated with "1", "two-base hit" is associated with "2", "three-base hit" is associated with "3", and "home run" is associated with "4," and stored in the storage 13. The selection unit 15 may acquire the text data in which the numbers "0" to "4" as the features and the player's names are combined, select a template that shows a chart of results corresponding to the player's name and the results of "hits," for example, or determine the display form (e.g., display position of the player's name and results, display size, font, or icon display) of the player's name and results (i.e., the material data) in the template. In addition, the selection unit 15 may also determine the display form in the ticker of the horse race, allowing the string to have a predetermined meaning (e.g., the race order of the entered horses) on the basis of a predetermined number and a predetermined string as the features included in the text data.

When the material data is audio data, the features of the material data correspond to the features of the audio data. The features of the audio data may be calculated, for example, by detecting a particular pulse sound or musical scale contained in the audio data. Storage of the association information in which the features of the audio data and the template are associated with each other allows one template or multiple templates to be selected from the audio data. For example, when a predetermined pulse sound is included at the beginning of the audio data, the pulse sound and the template are associated with each other in advance in the association information to allow one template or multiple templates to be selected. In addition, the features of the audio data may be calculated by recognizing audio in the audio data and converting it to text data to calculate the features of the text data as described above.

When the material data is image data, a feature of the material data corresponds to features of the image data. The features of the image data may be calculated by known features such as Edge features, Color features, Haar-like features or HOG features, for example. Storage of the association information in which the features of the image data and the template are associated with each other allows one template or multiple templates to be selected from the image data. For example, if the image data includes specific sports goods, sports facilities, and movements of athletes, for example, the image data detects features of the sports goods and others. The features of the image data of the sports goods and others and the template are associated with each other in the association information in advance, allowing one template or multiple templates to be selected.

Selecting a Template on the basis of the Provider of the Material Data

The selection unit 15 may select a template as the contents of the material data on the basis of the provider of the material data. The provider of the material data is directed to a person having provided the material data and information associated with the material data on a one-to-one basis. The provider of the material data may be identified by, for example, information identifying a person such as a user authenticated by the authentication unit 12, information identifying a device such as a terminal 21, or information on access to the material data such as a storage area of the material data in the material data provision device 4. Storage of the association information in which the provider of the material data is associated with the template allows the selection unit 15 to select one or more templates on the basis of the provider of the material data.

For example, a ticker tape in a particular display form may be used in a particular television program. When the provider of the material data is directed to a person that produces a ticker in the TV program, the selection unit 15 selects a template corresponding to the provider on the basis of the association information, thereby reducing the man-hours needed to select the template in the production of the ticker tape. The information processing apparatus 1 may provide a function that allows the user to manually select a template. For example, if the selection unit 15 determines that an appropriate template cannot be selected on the basis of the material data by the results of the calculation of the features, for example, the selection unit 15 may notify the user of this fact and encourage the user to manually select the template.

The production unit 16 produces the ticker data by applying the template selected by the selection unit 15 to the material data acquired by the material data acquisition unit 14. Applying the template to the material data is directed to applying the display form set in the template to the material data. The display form set in the template may include decorations for the material data, for example. For example, the production unit 16 produces ticker data for allowing text data to stream in a predetermined area of the display screen to be displayed. The production unit 16 may also produce ticker data displayed in a three-dimensional display. In addition, the production unit 16 may convert the audio data included in the video file obtained as material data to text data to produce ticker data in which the text data converted to video is superimposed as captions.

The production unit 16 may produce image data that is obtained by image transforming (rasterizing, for example) the ticker data to which the template is applied. That is, in this example, the ticker data produced by the production unit 16 may be data before it is converted to image data or after it is converted to an image.

When the selection unit 15 selects more than one templates, the production unit 16 produces the ticker data to which each template is applied. For example, if the selected templates set different display forms, the production unit 16 produces the material data as ticker data in each of the display forms.

The provision unit 17 provides the provision data including the ticker data produced by the production unit 16. The provision unit 17 provides the provision data to, for example, the terminal 21, the terminal 31 or the image distribution system 5 connected via the network 9. The provision data provided by the provision unit 17 may be, for example, communication data encoded according to a communication protocol via the network 9, or cryptographic data encrypted in a predetermined encryption scheme.

The provision unit 17 may provide the ticker data in a data format corresponding to the input of a transmission device 22 to a ticker data acquisition unit 212 of the terminal 21. For example, the provision unit 17 may provide a signal that complies with the video electrical standard of a serial digital interface (SDI), or data including the signal. The provision unit 17 may transmit the ticker data in accordance with the transmission time point of the transmission device 22. The provision unit 17 may also send out the ticker data in response to a request from the user system 2.

The user system 2 is an example of a system that transmits a ticker from the transmission device 22 to the broadcasting facility 23, which system provides the material data to the information processing apparatus 1 and obtains the ticker data from the information processing apparatus 1. The user system 2 includes the terminal 21, the transmission device 22, and the broadcasting facility 23. The terminal 21 includes the material data provision unit 211 and the ticker data acquisition unit 212.

The material data provision unit 211 provides the material data to the information processing apparatus 1. The material data provision unit 211 may provide the material data by the user (operator) of the terminal 21 operating the UI provided by the material data acquisition unit 14. For example, in the UI provided by the material data acquisition unit 14, the user selects a file containing the material data or enters the text data through a keyboard to obtain the material data.

The ticker data acquisition unit 212 acquires the ticker data produced by the information processing apparatus 1 and supplies it to the transmission device 22. For example, the ticker data acquisition unit 212 may acquire the ticker data by acquiring a signal from the provision unit 17 indicating that the ticker data is now available. When a plurality of ticker data is produced, the ticker data acquisition unit 212 acquires the plurality of produced ticker data. The ticker data acquisition unit 212 may display the plurality of acquired ticker data selectable to a user and output the selected ticker data to the transmission device 22.

The transmission device 22 is directed to a device that transmits a ticker image to the broadcasting facility 23, and may include, an image input unit for entering the ticker data, a frame buffer for temporarily storing the ticker data, and an image output unit for outputting the ticker data stored in the frame buffer as a frame image (ticker image) in a predetermined image form, which are not shown. The transmission device 22 outputs the ticker image temporarily stored in the frame buffer to the broadcasting facility 23 according to the instructions from a device (not shown) for controlling the transmission time point.

The broadcasting facility 23 is installed in a television broadcasting station and generates an image including a ticker used for television broadcasting by superimposing the ticker image transmitted from the transmission device 22 on the original image, for example.

Providing the material data allows the user system 2 to acquire the ticker data on the basis of the contents of the material data, thus reducing the production costs for producing the ticker data.

The user system 3 is an example of a system that displays an image on a display device 32 and obtains ticker data from the information processing apparatus 1. The user system 3 includes the terminal 31 and the display device 32. The terminal 31 includes a ticker data acquisition unit 311.

The ticker data acquisition unit 311 acquires the ticker data produced by the information processing apparatus 1 and outputs the ticker data as display data that can be displayed on the display device 32. For example, the ticker data acquisition unit 311 may acquire the ticker data by acquiring a signal from the provision unit 17 indicating that the ticker data is now available, in the same manner as in the ticker data acquisition unit 212. When a plurality of ticker data is produced, the ticker data acquisition unit 311 may acquire the plurality of produced ticker data, display the acquired plurality of ticker data selectable to the user, and then output the selected ticker data to the display device 32. The ticker data acquisition unit 311 may convert the acquired ticker data into display data (e.g., a video signal) that can be displayed on the display device 32, and output the data to the display device 32.

The display device 32 is directed to a device that displays the display data supplied from the ticker data acquisition unit 311. The display device 32 is, for example, a large display installed in a public place, or digital signage installed in a commercial facility, for example.

The user system 3 is capable of acquiring the ticker data on the basis of the contents of the material data, reducing the production costs for producing the ticker data.

The material data provision device 4 exemplifies a device that provides material data to the information processing apparatus 1. The material data provision device 4 is directed to, for example, a network storage service that stores material data in a readable form. The material data provision device 4 may provide the material data, for example, by enabling the material data stored using a predetermined network address and password to be readable. The information processing apparatus 1 is capable of producing the ticker data on the basis of the contents of the material data provided by the material data provision device 4, thereby reducing the production costs for producing the ticker data.

The image distribution system 5 is directed to a system for distributing an image (a moving image or still image) on the basis of the ticker data provided by the provision unit 17 to a destination (not shown) in real time or on demand. The image distribution system 5 may be a video distribution system that distributes videos. The image distribution system 5 may distribute the ticker data itself, or an image on which the ticker data is superimposed.

The network 9 is directed to, for example, the Internet. The network 9 may include, for example, a cell phone base station and a wireless LAN access point.

The communication controller 11, the authentication unit 12, the storage 13, the material data acquisition unit 14, the selection unit 15, the production unit 16, and the provision unit 17, each of which is possessed by the information processing apparatus 1, are an example of functional units of the information processing apparatus 1, and do not limit the functions of the information processing apparatus 1. For example, the information processing apparatus 1 need not have all of the above functional units and may have some of the functional units. The information processing apparatus 1 may also have functions other than those described above. For example, the information processing apparatus 1 may have an input function for entering information and an output function for reporting the operational status of the apparatus with an LED lamp, for example.

The functional units of the information processing apparatus 1 above are described as being software. However, at least one or more of the above functional units of the information processing apparatus 1 may be hardware.

Any of the above functional units of the information processing apparatus 1 may be implemented by dividing one functional unit into a plurality of functional units. Any two or more of the above-mentioned functional units of the information processing apparatus 1 may be consolidated into one functional unit. That is, FIG. 1 represents the functions of the information processing apparatus 1 in functional blocks, and does not indicate, for example, that each functional unit is composed of a separate program file.

The information processing apparatus 1 may be an apparatus embodied by a single housing, or a system embodied by a plurality of devices connected via a network, for example. For example, the information processing apparatus 1 may embody some or all of its functions by other virtual devices such as a cloud service provided by a cloud computing system. That is, the information processing apparatus 1 may embody at least one or more of the above functional units in the other devices. The information processing apparatus 1 may be a general purpose computer such as a desktop PC, or a dedicated device with limited functionality.

Figure 2:
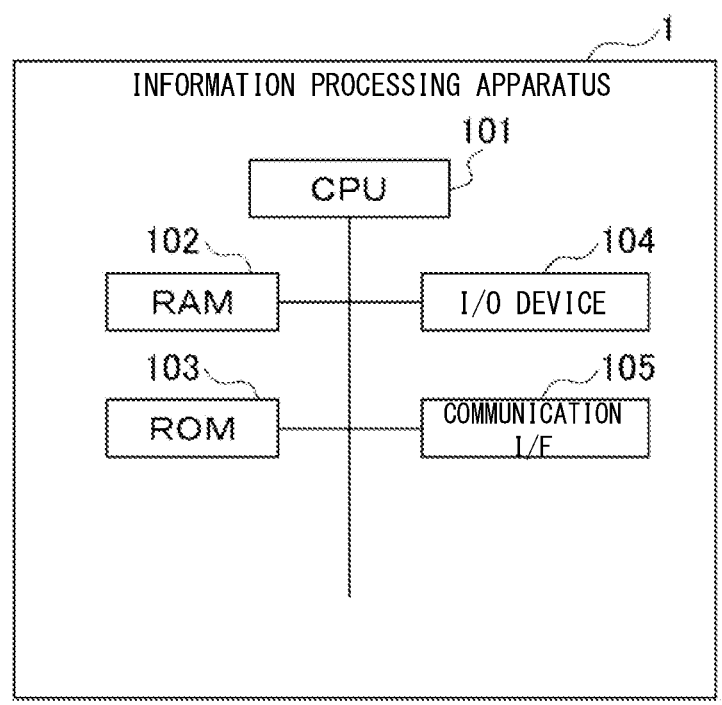
FIG. 2 is a block diagram illustrating an example of a hardware configuration of the information processing apparatus.

Next, with reference to FIG. 2, a hardware configuration of the information processing apparatus 1 will be described. FIG. 2 is a block diagram illustrating an example of the hardware configuration of the information processing apparatus 1 according to an example.

The information processing apparatus 1 includes a central processing unit (CPU) 101, a random access memory (RAM) 102, a read-only memory (ROM) 103, an I/O device 104, and a communication interface (I/F) 105. The information processing apparatus 1 is directed to an apparatus that executes the information processing program described with reference to FIG. 1.

The CPU 101 controls the user terminal by executing the information processing program stored in the RAM 102 or ROM 103. The information processing program is obtained, for example, from a recording medium in which the program is stored or from a program distribution server via a network, installed in the ROM 103, and read and executed by the CPU 101.

The I/O device 104 has an operation input function and a display function (operation display function). The I/O device 104 is, for example, a touch panel. The touch panel enables the user of the information processing apparatus 1 to operate and input data using a fingertip or a touch pen, for example. Although the I/O device 104 according to this example is described in using a touch panel having an operation display function, the I/O device 104 may have a display device having a display function and an operation input device having an operation input function separately. In this example, the display screen of the touch panel may be implemented as the display screen of the display device, and the operation of the touch panel may be implemented as the operation of the operation input device. The I/O device 104 may be embodied in various forms such as a head-mounted display, eyeglass display, and wristwatch display, for example.

The communication I/F 105 is directed to a communication I/F. The communication I/F 105 performs near field wireless communication such as wireless LAN, wired LAN, and infrared, for example. Although FIG. 2 illustrates only a communication I/F 105 as a communication I/F, the information processing apparatus 1 may have an I/F for each communication in a plurality of communication methods.

Figure 3:
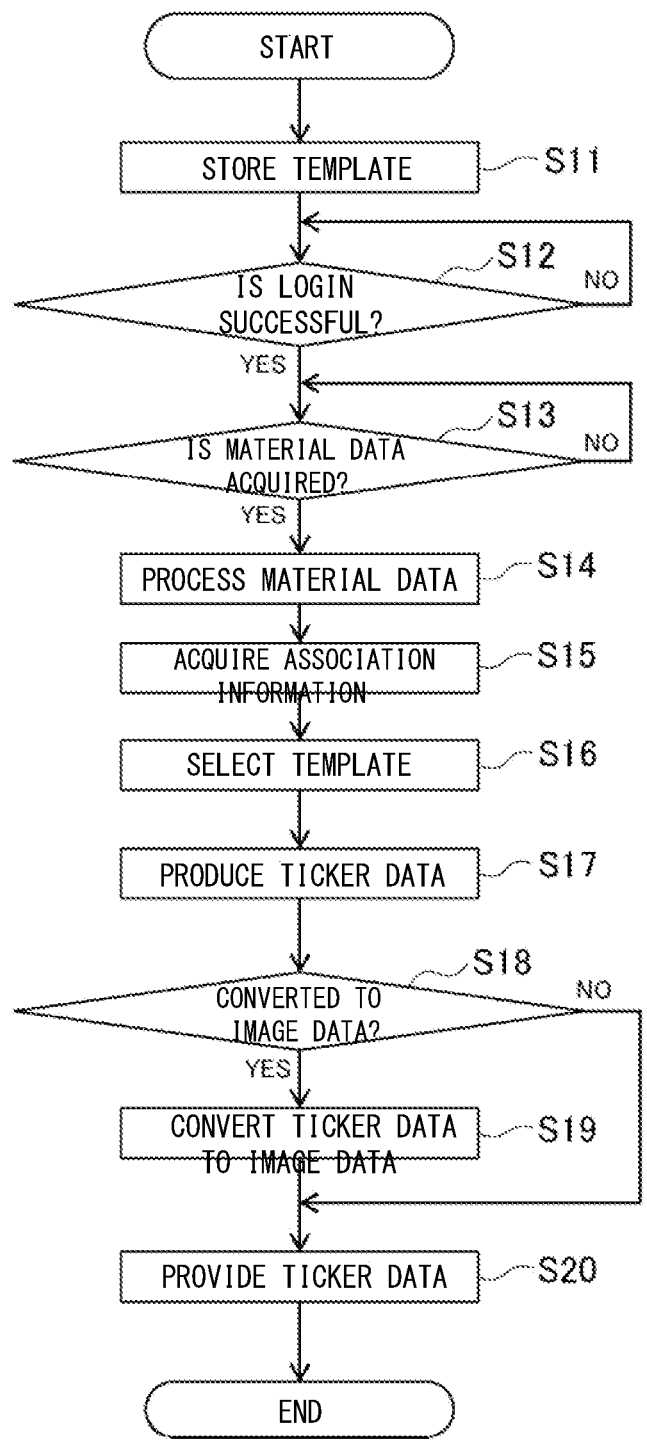
FIG. 3 is a flowchart illustrating an example of operations of the information processing apparatus.

Next, with reference to FIG. 3, operations of the information processing apparatus 1 will be described. FIG. 3 is a flowchart illustrating an example of operations of the information processing apparatus 1 according to an example. Although the subject of execution of the operations in the flowchart shown below is described as being the information processing apparatus 1, each operation may be performed by the corresponding functional unit of the information processing apparatus 1 described above.

In FIG. 3, the information processing apparatus 1 prepares the material data to be applied by storing the template in the storage 13 (step S11). For example, the information processing apparatus 1 may perform the process in step S11 by storing the template data and association information in which the material data is associated with the template in the storage 13 in a readable manner.

After executing the process in step S11, the information processing apparatus 1 determines whether the user of the terminal 21 has successfully logged in (step S12). Whether the login is successful may be determined by whether the authentication by the authentication unit 12 is successful. If it is determined that the login has not been successful (step S12: NO), the information processing apparatus 1 repeats the process in step S12 and waits for the login to be successful.

In contrast, if it is determined that the login has been successful (step S12: YES), the information processing apparatus 1 determines whether the material data has been acquired (step S13). Whether the material data has been acquired may be determined, for example, by whether the material data acquisition unit 14 has acquired the material data. If it is determined that the material data has not been acquired (step S13: NO), the information processing apparatus 1 repeats the process in step S13 and waits for the material data to be acquired.

In contrast, if it is determined that the material data has been acquired (step S13: YES), the information processing apparatus 1 processes the material data (step S14). The material data is processed, for example, by calculating the features of the text data contained in the material data acquired by the material data acquisition unit 14. The material data may also be processed by calculating the features of the audio data contained in the material data acquired by the material data acquisition unit 14. The material data may also be processed by calculating the features of the image data contained in the material data acquired by the material data acquisition unit 14. The material data may also be processed by acquiring the provider information of the material data acquired by the material data acquisition unit 14.

After executing the process in step S14, the information processing apparatus 1 acquires the association information (step S15). The association information may be acquired, for example, by the selection unit 15 reading the association information stored in the storage 13. The association information may also be acquired in accordance with the acquired material data. For example, if the text data is contained in the material data, the information processing apparatus 1 acquires association information for associating the features of the text data indicating the characteristics of the text data with the template. In the same manner, the information processing apparatus 1 may acquire association information for associating the features of audio data indicating the characteristics of the audio data with a template, association information for associating the features of image data indicating the characteristics of the image data with a template, or association information for associating the provider information for providing the material data with a template.

After executing the process in step S15, the information processing apparatus 1 selects the template (step S16). The template may be selected, for example, by the selection unit 15 selecting the template corresponding to the material data on the basis of the calculated features of the material data and the acquired association information.

After executing the process in step S16, the information processing apparatus 1 produces the ticker data (step S17). The ticker data may be produced, for example, by the production unit 16 applying a template selected by the selection unit 15 to the material data acquired by the material data acquisition unit 14.

For example, if the material data is text data, the production unit 16 produces ticker data to allow the text data to stream in a predetermined area of the display screen set in the template to be displayed. The production unit 16 may also produce a ticker in which the text data is displayed in a three-dimensional form set in the template. When the material-data is audio data, the production unit 16 may convert the audio data included in the video file obtained as the material data to text data on the basis of the template settings, and produce ticker data in which the text data converted to video is superimposed as captions in a predetermined area of the display screen. Further, when the material data is image data, the production unit 16 may produce ticker data allowing the image data to be displayed in a predetermined area of the display screen set in the template.

If the template includes settings for the material data of a plurality of any of the text data, audio data, or image data, the production unit 16 produces ticker data in which each piece of the material data is applied to the template. For example, if the settings are made for the text data and image data in the template, and the material data includes the text data and image data, the production unit 16 produces ticker data in which the template is applied to each of the text data and image data.

After executing the process in step S17, the information processing apparatus 1 determines whether the ticker data is converted to image data (step S18). Whether the ticker data is converted to image data may be determined, for example, by the production unit 16 or the provision unit 17 determining depending on the destination of the ticker data. The recipient of the ticker data may, for example, obtain the ticker data along with the material data as supplementary information to the material data. When the production unit 16 or the provision unit 17 may determine, in the supplementary information of the material data, that the destination of the ticker data is the display device 32, for example, the production unit 16 or the provision unit 17 may determine that the ticker data is converted to the image data. If it is determined that the ticker data is converted to the image data (step S18: YES), the information processing apparatus 1 converts the ticker data to the image data (step S19). The image data may be converted, for example, by the production unit 16 or the provision unit 17 converting the format of the ticker data to a data format in accordance with the display device displaying the ticker.

After executing the process in step S19 or if it is determined the ticker data is not converted to the image data (step S18: NO), the information processing apparatus 1 provides the ticker data (step S20). The ticker data may be provided by the provision unit 17 providing the ticker data (including ticker data after being converted to the image data) to the user system 2, the user system 3, or the image distribution system 5, for example. After executing the process in step S20, the information processing apparatus 1 terminates the operations shown in the flowchart.

The illustrated flowchart is an example of the operations of the information processing apparatus 1 and does not limit the operations in the information processing apparatus 1.

Next, with reference to FIG. 4, the association information used to associate the features of the material data indicating the characteristics of the material data with the template will be described. FIG. 4 illustrates an example of association information used in the information processing apparatus 1.

In FIG. 4, the association information A has data in which text features, audio features, image features, and a provider, that are exemplified as features of the material data indicating the characteristics of the material data, are associated with the templates. The association information A may be stored in advance in the storage 13 as file data for each user, for example. The association information A has the data items of "major classification," "medium classification," "minor classification," "text features," "audio features," "image features," "provider," and "template." The data item "template" is information that uniquely identifies the template.

The association information A classifies the templates according to the three levels of classification, namely, "major classification," "medium classification," and "minor classification." In the major classification, the association information A is further classified into "sports," "general purpose," "SNS," and "election" depending on the type. For example, template "S1" is directed to a template classified into "sports" for the major category, "baseball" for the medium category, and "professional baseball" for the minor category, and is used to generate ticker data for TV broadcasts of professional baseball games. The types and levels of these classifications are an example of association information and may vary from user to user.

Each of the classified templates has features of "text features," "audio features," "image features," and "provider." For example, when text data is included in the material data, the selection unit 15 calculates the features of the text data, allowing the selection unit 15 to select one or more templates that approximate the features calculated in the "text features." If the material data has a plurality of features among the "text features," "audio features," "image features," and "provider," the selection unit 15 may select a template that approximates each of the features. For example, if template "S1" is selected in the "text features" and template "S2" is selected in the "image features," the selection unit 15 may select the two templates, "S1" and "S2." The selection unit 15 may establish a priority in the features of "text features," "audio features," "image features," and "provider," and may select one template in the features with a higher priority. The contents of the material data are calculated as features, allowing a template suitable for the material data to be automatically selected.

Figure 5:
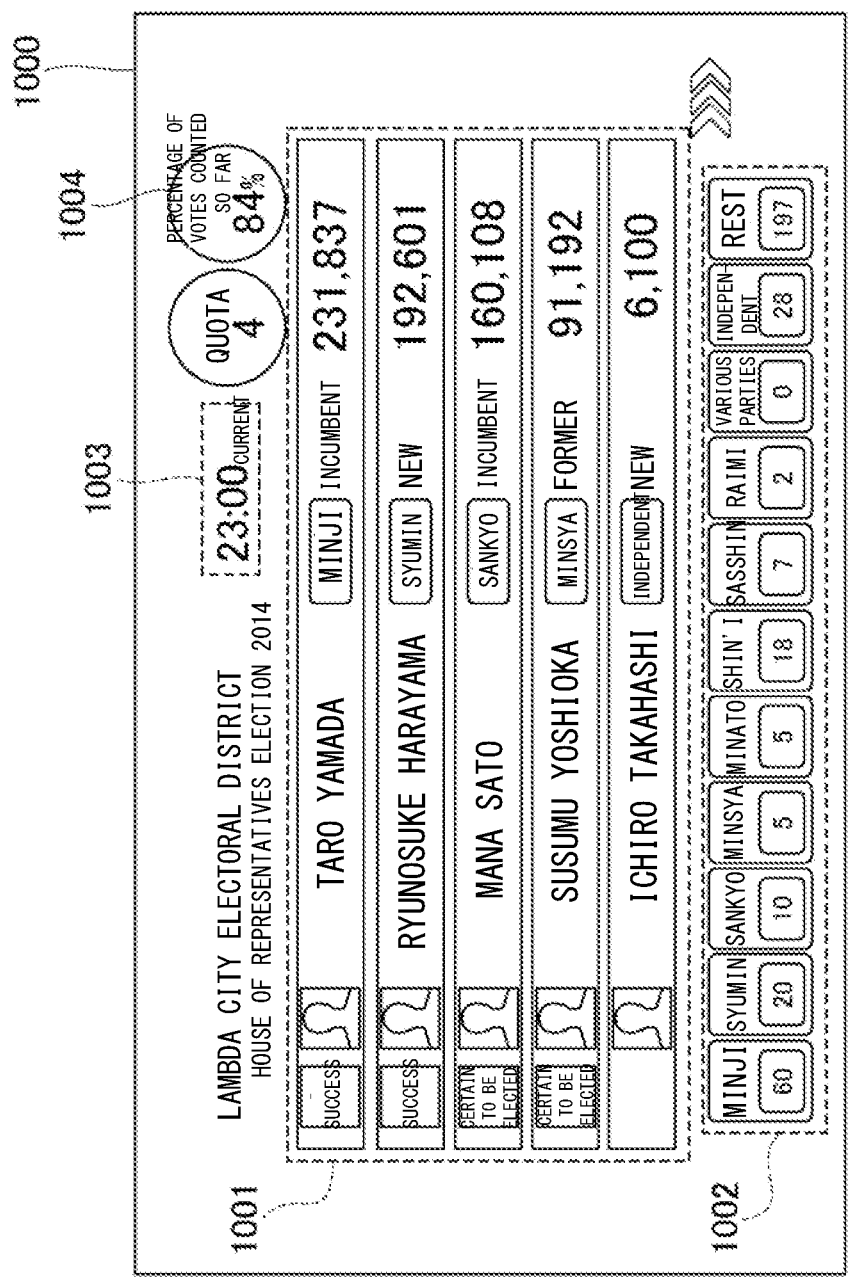
FIG. 5 is an example of a ticker produced by applying a template used in the information processing apparatus.

Next, with reference to FIG. 5, the template will be described. FIG. 5 shows an example of a ticker produced by applying a template used in the information processing apparatus according to an embodiment.

FIG. 5 shows a ticker used in an election program in the TV broadcasts, which is produced by applying the material data to a template for the election. A ticker 1000 includes a display 1001 for displaying the number of votes received for each candidate, a display 1002 for displaying the number of seats for each political party, a display 1003 for displaying the current time, and a display 1004 for displaying the current percentage of votes counted so far.

For example, the display 1001 includes an icon indicating whether the candidate is elected or unelected, a photo of the candidate, the candidate's name, an icon of the candidate's political party affiliation, an icon indicating the current status (incumbent, new or former member of Diet), and an indication of the number of votes received. The icons and candidate photos above are displayed as the material data on the basis of the image data. The template for the election sets the display position of the icon image and the candidate's photo as image data, or the size of the display, for example. The text data of the candidate's name and the number of votes received are displayed as the material data on the basis of the text data. The template for election sets the display position, display size, and font for displaying the text data, for example. The template is also set to display one column of material data for one person and five material data for five people.

The template for election also sets the icon of the name of the political party (image data) and the number of seats (text data) in the display 1002, the current time (text data) in the display 1003, and the display position, size, and font of the percentage of votes counted so far (text data) in the display 1004, for example.

The storage 13 stores the template for election with the display position and other items of the above material data set in advance. If the template for election is selected according to features of the text data or features of the image data in the material data, the stored template is automatically selected and the template for election is applied to the material data to produce the ticker data for displaying the illustrated ticker.

The various processes described above may be performed by recording a program for embodying the functions configuring the apparatus described in the present embodiment on a computer-readable recording medium and allowing the computer system to read and execute the program recorded on the recording medium. The "computer system" referred to herein may include hardware such as an OS and peripherals. The phrase "computer system" shall also include the environment in which the website is provided (or displayed) if the world wide web WWW system is used. A "computer-readable recording medium" is a storage device such as a writable non-volatile memory, which may include a flexible disk, a magneto-optical disk, a ROM, and a flash memory, a portable medium such as a CD-ROM, and a hard disk built into a computer system.

Moreover, a "computer-readable recording medium" may include a medium that holds a program for a certain amount of time, such as a volatile memory (e.g., dynamic random access memory DRAM) in a computer system that serves as a server or client when the program is transmitted through a network such as the Internet or a communication line such as a telephone line. The program above may be transmitted from a computer system storing this program in a storage device, for example, to another computer system via a transmission medium or by transmission waves in the transmission medium. The "transmission medium" for transmitting a program refers to a medium having a function of transmitting information, such as a network (communication network) such as the Internet or a communication channel (communication line) such as a telephone line. The program above may also be used to embody some of the aforementioned functions. Furthermore, the program may be a so-called differential file (differential program) that embodies the aforementioned functions in combination with a program already stored in the computer system.

Although the examples have been described above with reference to the drawings, the specific configuration is not limited to the examples, and various modifications may be made without departing from the spirit of this disclosure.

What is claimed is:

1. An information processing apparatus configured to execute the functions of:
    storing a template that defines a display form of a ticker;
    acquiring a material data to be displayed on the ticker, the ticker being information which is superimposed with an original image based on the material data;
    storing an association information for associating the material data and the template;
    selecting a template stored in a storage based on contents of the material data acquired by the information processing apparatus;
    producing ticker data by applying the template selected by the information processing apparatus to the material data acquired by the information processing apparatus; and
    providing data including the ticker data produced by the information processing apparatus;
wherein
    the information processing apparatus comprises a central processing unit and is configured to:
    store an association information for associating provider information that provides the material data with the template,
    obtain the association information for associating the provider information that provides the material data with the template, and
    select, if the material data acquired by the information processing apparatus includes the provider information, a template corresponding to the provider information of the material data based on the acquired provider information and the acquired association information as the template selected by the information processing apparatus, and
wherein the original image is a television image used for television broadcasting.

2. The information processing apparatus according to claim 1, wherein
    the information processing apparatus is configured to:
    obtain association information for associating features of text data indicating characteristics of the text data with the template,
    calculate, when the material data acquired by the information processing apparatus contains the text data, features of the acquired text data, and
    select the template corresponding to the text data based on the calculated features of the text data and the acquired association information as the template selected by the information processing apparatus.

3. The information processing apparatus according to claim 1, wherein
    the information processing apparatus is configured to:
    obtain association information for associating features of audio data indicating characteristics of the audio data with the template,
    calculate, when the material data acquired by the information processing apparatus contains the audio data, features of the acquired audio data, and
    select the template corresponding to the audio data based on the calculated features of the audio data and the acquired association information as the template selected by the information processing apparatus.

4. The information processing apparatus according to claim 1, wherein
    the information processing apparatus is configured to:
    obtain association information for associating features of image data indicating characteristics of the image data with the template,
    calculate, when the material data acquired by the information processing apparatus contains the image data, features of the acquired image data, and
    select the template corresponding to the image data based on the calculated features of the image data and the acquired association information as the template selected by the information processing apparatus.

5. The information processing apparatus according to claim 1, wherein
    the information processing apparatus selects a plurality of templates on the basis of contents of the material data acquired by the information processing apparatus,
    the information processing apparatus produces a plurality of ticker data by applying the plurality of templates selected by the information processing apparatus, and the information processing apparatus provides the plurality of ticker data produced by the information processing apparatus in a selectable manner.

6. The information processing apparatus according to claim 1, wherein the information processing apparatus provides the ticker data produced by the information processing apparatus as image data.

7. The information processing apparatus according to claim 1, wherein the provider information of the material data is directed to a person having provided the material data and information associated with the material data on a one-to-one basis.

8. A method of processing information executed in an information processing apparatus, the method comprising the steps of:

storing a template that defines a display form of a ticker;

acquiring material data to be displayed on the ticker, the ticker being information which is superimposed with an original image based on the material data;

storing an association information for associating the material data and the template;

selecting a template stored in the storing step based on contents of the material data acquired by the material data acquiring step;

producing ticker data by applying the template selected in the selecting step to the material data acquired in the material data acquiring step;

providing provision data including the ticker data produced in the producing step; and storing an association information for associating provider information that provides the material data with the template, wherein the step of selecting a template comprises:

obtaining the association information for associating the provider information that provides the material data with the template, and selecting, if the material data acquired by the material data acquiring step includes the provider information, a template corresponding to the provider information of the material data based on the acquired provider information and the acquired association information, and wherein the original image is a television image used for television broadcasting.

9. A non-transitory computer readable medium recording an information processing program that causes a computer to execute the functions of:

storing a template that defines a display form of a ticker;

acquiring material data to be displayed on the ticker, the ticker being information which is superimposed with an original image based on the material data;

storing an association information for associating the material data and the template;

selecting a template stored in the storing function based on contents of the material data acquired by the material data acquiring function;

producing ticker data by applying the template selected by the selecting function to the material data acquired by the material data acquiring function;

providing provision data including the ticker data produced by the producing function; and storing an association information for associating provider information that provides the material data with the template, wherein the function of selecting a template comprises:

obtaining the association information for associating the provider information that provides the material data with the template, and selecting, if the material data acquired by the material data acquiring function includes the provider information, a template corresponding to the provider information of the material data based on the acquired provider information and the acquired association information, and wherein the original image is a television image used for television broadcasting.

\* \* \* \* \*